No. 863,654. PATENTED AUG. 20, 1907.
J. ROTTKAMP.
HORSESHOE.
APPLICATION FILED MAY 28, 1906. RENEWED MAY 10, 1907.

2 SHEETS—SHEET 1.

Witnesses
Otto Kramer
Jacob Schaefer

Inventor
Johann Rottkamp
per Herbert W. Jenner.
Attorney.

UNITED STATES PATENT OFFICE.

JOHANN ROTTKAMP, OF COLOGNE, GERMANY.

HORSESHOE.

No. 863,654.   Specification of Letters Patent.   Patented Aug. 20, 1907.

Application filed May 28, 1906, Serial No. 319,097. Renewed May 10, 1907. Serial No. 372,878.

*To all whom it may concern:*

Be it known that I, JOHANN ROTTKAMP, a subject of the Emperor of Germany, residing at Cologne-on-the-Rhine, in the Province of Rhineland, Germany, have invented certain new and useful Improvements in Horseshoes, for which I have received Letters Patent in Belgium, No. 152,288, dated January 20, 1906, and Luxemburg, No. 6,260, dated February 26, 1906; and I do hereby declare the following to be a full, clear, and exact description of the invention, such as will enable others skilled in the art to which it appertains to make and use the same.

For the purpose of effectually preventing horses from slipping or falling on smooth roadways a number of devices have already been employed in connection with horse-shoes, as for example inlaid and underlaid pieces of india-rubber. These however do not fully meet requirements as they are only adapted for receiving the entire pressure of the animals foot while in the case of side pressure that is to say in the case of the horse actually slipping they do not act. These disadvantages are completely obviated by the present invention, according to which the horse-shoe is made in two parts like the known horse-shoes of a similar kind, one of these parts consisting of a plate fixed on all sides of the hoof and the other of an iron tread-piece fixed to such plate.

The novelty of the present horse-shoe consists in the plate which is attached to the foot and furnished with a claw-like tread-rim provided nearly in the middle with a screw against which a second plate lying inside the tread-rim is movably attached and when the horse slips, moves back partially behind the claws of the tread-rim, so that the claws can come in contact with and take hold in the ground. Thereby slipping on smooth surfaces such as asphalt paving or paving covered with ice is effectually prevented.

Figure 1:
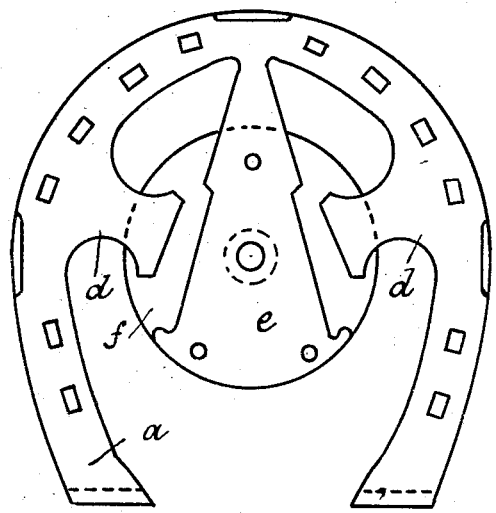
Figure 2:
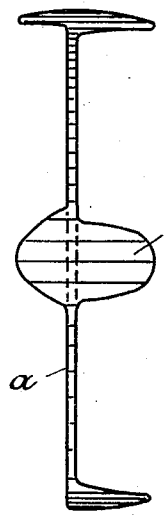
Figure 3:
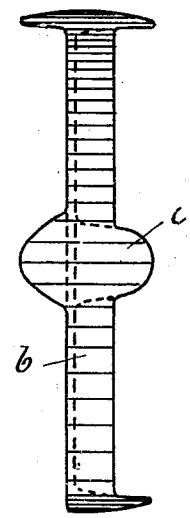
Figure 4:
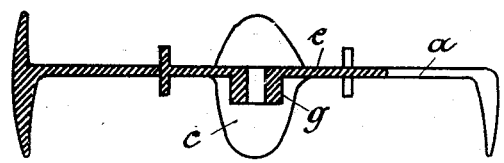
Figure 5:
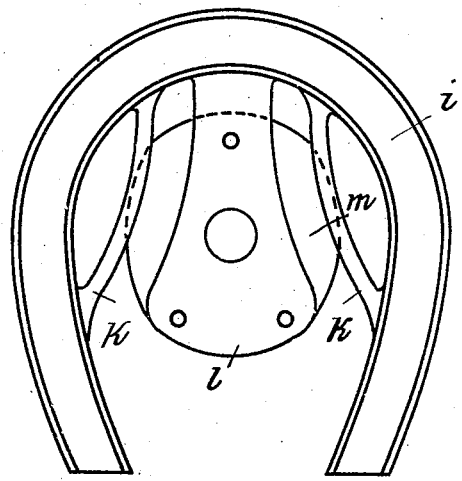
Figure 6:
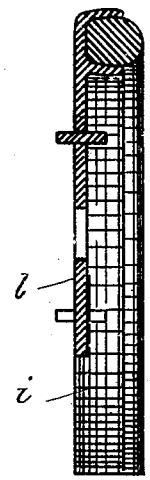
Figure 7:
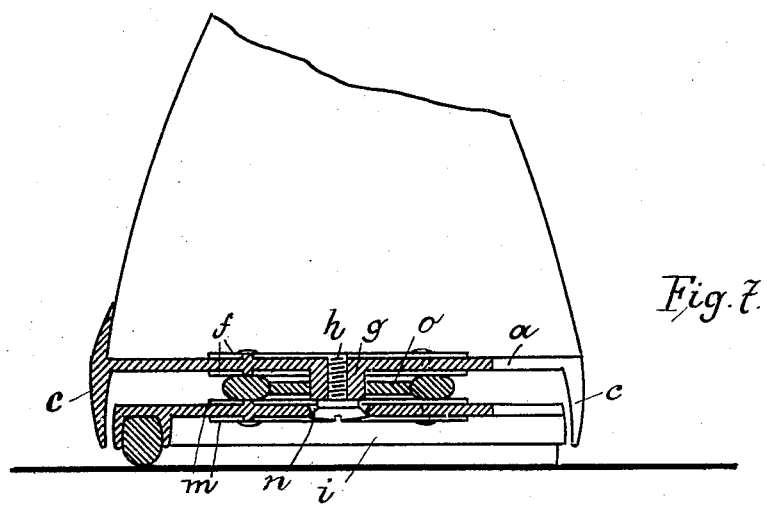
Figure 8:
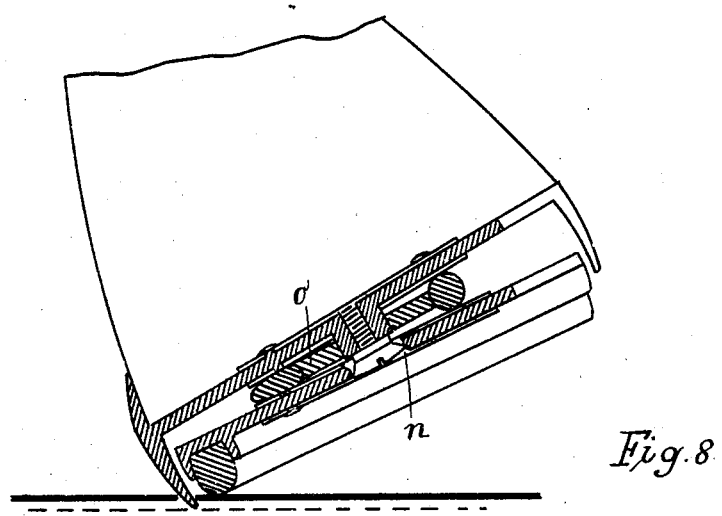

The invention is illustrated in the accompanying drawings in which: Figure 1 is a view of the upper side of the plate to be attached to the horses hoof. Fig. 2 is a side view of this plate. Fig. 3 is a modification of the plate. Fig. 4 is a longitudinal section of Fig. 1. Fig. 5 represents a view of the under side of the iron tread-piece and Fig. 6 is a longitudinal section of Fig. 5. The Figs. 7 and 8 are longitudinal sections of the horse-shoe, showing the two parts connected together in their positions, when the horse is moving in the ordinary way and when it is slipping.

A thin plate $a$ (Fig. 1—4) of steel or tempered iron of the same shape as the horse hoof, which may, as is shown in Fig. 3, be provided with a rim $b$, has on its edge a number of sharp-edged claws $c$, which run downwards at right angles to the plane of the plate. This plate $a$, which is attached to the horses' hoof by means of horse-shoe nails, is provided with the extensions $d, d, e$, which are partially covered by two disks $f f$, fastened by rivets to the middle extension $e$. In consequence of this arrangement it is possible to fit exactly the plate to the shape of the horses hoof.

The middle extension $e$ bears a collar $g$, into which a screw-pin $h$ with a rounded head is screwed. By means of this pin the actual tread plate $i$, which may be in the form of the grooved iron with "tow" packing, illustrated in Figs. 5 and 6 is fixed so that with the aid of the disk-like excision $n$ it can oscillate around the head of the screw.

The part $i$ is provided with extensions or flanges $k, k, l$, which are in the same manner as the extensions $d e$ of the plate $a$, covered by disks $m, m$, riveted to the middle extension $l$. Between the parts $a$ and $i$ an india-rubber ring $o$ is inserted.

The action of the device is as follows: When the horse is moving in the ordinary way, it treads uniformly on the "tow" lining of the part $i$, without any oscillation of the plate arising; consequently the claws $c$ cannot come into action. If, however, the animal slips, for example forwards (Fig. 8), the part $i$ is pressed inwards, the claws in front of the part $i$ come in contact with the roadway and thus recover the hold lost by the horse. A similar action takes place if the horse slips in another direction.

A further advantage of the new horse shoe is that the horse provided therewith always has a flexible tread and thus does not become foot-sore and the possibility of injury to the horse by moving over asphalt paving is impossible as when the animal is moving in the ordinary way the claws do not come in contact with the ground.

What I claim and desire to secure by Letters Patent, is—

1. A horseshoe, comprising a shoe-plate for attachment to the hoof provided with a projecting rim, a tread-plate, and means for connecting together the said plates pivotally at their middle parts so that the tread-plate is free to oscillate on all sides within the said rim.

2. The improved horse-shoe consisting of two parts, a horse-shoe plate $a$ attached to the horse's hoof and furnished with a claw-like rim $c$ and a tread-plate $i$, fixed to the plate $a$ by means of a screw $h$ and oscillating on all sides inside the rim around the head of the screw.

In testimony whereof I have affixed my signature, in presence of two witnesses.

JOHANN ROTTKAMP.

Witnesses:
LOUIS VANDORN,
OTTO KRAMER.